United States Patent [19]

le Chatelier et al.

[11] Patent Number: 4,696,334

[45] Date of Patent: Sep. 29, 1987

[54] DEFLATING DEVICE FOR PNEUMATIC TIRES OF VEHICLES

[75] Inventors: Robert le Chatelier; André Sinic, both of Paris; Jean-Jacques Diefenbach, Sannois, all of France

[73] Assignee: Precision Mecanique Labinal, France

[21] Appl. No.: 630,268

[22] Filed: Feb. 18, 1986

[30] Foreign Application Priority Data

Feb. 18, 1985 [FR] France ............................ 85 02296
Sep. 3, 1985 [FR] France ............................ 85 13059

[51] Int. Cl.⁴ ...................... B60C 23/00; B60C 29/00
[52] U.S. Cl. .................................. 152/417; 137/487.5; 141/95; 152/415; 200/61.25; 340/58
[58] Field of Search ............... 152/415, 416, 417, 427; 200/61.25; 340/58; 137/224, 487.5; 141/95, 94

[56] References Cited

U.S. PATENT DOCUMENTS

| | | | |
|---|---|---|---|
| 2,693,841 | 11/1954 | Webster, Jr. ..................... | 152/417 |
| 3,361,180 | 1/1968 | Neilson et al. ................... | 152/415 |
| 4,330,774 | 5/1982 | Doty ............................. | 200/61.25 X |
| 4,418,737 | 12/1983 | Goodell et al. .................. | 152/417 X |
| 4,441,539 | 4/1984 | Hulse ............................ | 152/417 |
| 4,456,038 | 6/1984 | Gwaltney et al. ................. | 152/415 X |
| 4,562,874 | 1/1986 | Scheller ......................... | 152/427 |

FOREIGN PATENT DOCUMENTS

| | | | |
|---|---|---|---|
| 0716880 | 8/1965 | Canada ........................... | 152/415 |
| 2548780 | 1/1985 | France ........................... | 152/415 |

Primary Examiner—Donald E. Czaja
Assistant Examiner—Ramon R. Hoch
Attorney, Agent, or Firm—Larson and Taylor

[57] ABSTRACT

The deflating device, in particular intended for rapid intervention or military vehicles, comprises a servovalve (18) having a large-section passage instantaneously putting the interior of the tire in communication with the open air, a pressure sensor (21) with an associated circuit (22,23,24) an electrovalve (17) and its associated circuit being supplied with a chopped or otherwise interrupted current through a rotating transformer (12,14), the sensor circuit being such that, when the predetermined low pressure value is reached, it causes the closure of the servovalve (18) by the electrovalve (17).

28 Claims, 5 Drawing Figures

DEFLATING DEVICE FOR PNEUMATIC TIRES OF VEHICLES

The present invention relates to a deflating device for pneumatic tires of vehicles and in particular rapid intervention vehicles, such as airport fire-fighting or military vehicles.

Certain rapid intervention vehicles, and in particular airport fire-fighting or military vehicles, must be capable of travelling very rapidly over grounds devoid of a rolling surface layer or grounds covered with snow. These vehicles must therefore be capable of very rapidly changing from a state of normal inflation of the tires of the wheels adapted for routine travelling over runways to a state of under-inflation of the tires in which the pressure of the tires is adapted for travelling over the surrounding ground which may be, as the case may be, sand, snow, ice or mud, etc. In other cases, vehicles travelling in particular on roads, whose tire pressure is therefore adapted for this purpose, must be capable of rapidly changing to travel over the surrounding ground at high speed, which also requires a rapid reduction in the pressure prevailing in the tires to a lower value. Deflating devices are already known for vehicles of this type which usually also permit the inflation of the tires and employ conduits connecting the chassis of the vehicles to the wheels through rotating sealing elements. In many cases, and in particular in airport fire-fighting vehicles, these deflating devices known at the present time require, for deflating to the required value, a lapse of time which is out of proportion to the requirements of the mission.

An object of the present invention is to overcome these drawbacks and to provide a deflating device for pneumatic tires of vehicles, and in particular rapid intervention vehicles or military vehicles, which insures the deflation of the tires within a lapse of time which is distinctly shorter than the lapse of time of known devices, namely on the order of 15 sec/$Nm^3$ between 3 bars and 1 bar (relative).

Another object of the invention is to provide such a device which is capable of insuring the deflation of the tires of the vehicle while the latter is moving.

Another object of the invention is to provide such a deflating device which is extremely reliable and involves practically no risk of breakdown in a difficult environment, whether it concerns very low temperatures prevailing in polar regions or very high temperatures prevailing in arid regions. Further, the device must be insensitive to other conditions of the environment, such as rain, snow, ice, dust, or mud, etc.

A further object of the invention is to provide such a device which can be improved to permit also an inflation of the tires of the vehicle.

The invention therefore provides a deflating device for wheels of vehicles, and in particular rapid intervention vehicles, which is adapted to permit, by means of a centralized control, an extremely rapid deflation of the pneumatic tires of the wheels of the vehicle, said device comprising, on each wheel including a pneumatic tire to be deflated, a servovalve comprising a valve having a large- section passage capable of instantaneously putting the tire in communication with the open air, and a pressure sensor responsive to the pressure of the tire and with which is associated an electric circuit connected to an electrovalve of the servovalve for causing the closure of the valve closure member, said device further comprising in the region of each of said wheels, an electromagnetic coupling element constituted by a rotating transmitter whose primary winding, which is fixed relative to the chassis of the vehicle, is supplied with current from a source of current and whose secondary winding, which is mounted on the wheel and rotates without contact with the primary winding in confronting relation to the primary winding, is connected, on one hand, to the electrovalve for controlling the electrovalve and, on the other hand, to the circuit of the pressure sensor, said circuit being so adapted that, when the pressure detected by the sensor has reached a predetermined low value, it interrupts the connection between the tire and the open air.

In a preferred embodiment of the invention, the source of electric current sends to the primary winding of each rotating transmitter a chopped or otherwise "interrupted" direct current which thus permits the passage into the secondary winding of great power which may be on the order of several tens of watts which insures an effective, reliable and rapid control of the electrovalve and a sufficient supply of the circuit associated with the sensor which became responsive to the pressure.

The frequency of the chopped or interrupted current is so chosen as to be compatible with the electric or electromagnetic environment, and in particular hertzian environment, in which the vehicle may be required to operate.

Preferably, the current supply is controlled by means of a computer adapted to send the current simultaneously to the various primary windings of the rotating transmitters which provide the coupling in the region of the various wheels of the vehicle.

According to an improvement of the invention, the device may also be used for inflating the pneumatic tires of the vehicle. and in particular inflating them while the vehicle is travelling, and in this case there if provided on the vehicle a source of compressed air or gas, distribution electrovalves controlled by a computer for transmitting the pressure to the various wheels, each time through rotating sealing elements which are put under pressure only during the inflating operation, said rotating sealing elements communicating with the servovalve of each tire, which servovalve is then designed, in the known manner, to be capable of insuring the deflation or inflation, in accordance with instructions passing through the electromagnetic coupling device.

Preferably, the servovalve which has a large passage for the deflation capable of being closed by a valve closure member, uses the pressure existing in the tire that it serves for providing an assistance to the opening. In this case it comprises an auxiliary passage connected to the tire and closed by an auxiliary valve closure member capable of being opened by the electrovalve so as to then transmit the pressure to a driving element, such as a diaphragm of large area, capable of opening the main valve closure member.

In a particularly preferred embodiment, the servovalve is devoid of any usual piston or slide and comprises diaphragms which insure the driving movements and serve to guide the moving parts, and in particular the valve closure member or members.

Advantageously, the device comprising the rotating transmitter having a primary winding and a secondary winding separated by an air gap, one of which is carried by the fixed part of the vehicle while the other is carried by the wheel, and being disposed in confronting relation to each other, is characterized in that the primary and secondary windings are disposed between two wheel rolling bearings.

The rolling bearings may advantageously be the bearings interposed between a stub-axle and the coaxial rim of the wheel.

Preferably, and according to an improvement of the invention, in particular in the case where the device is associated with inflating and/or deflating means employing an air passage through rotating sealing means, the rotating transformer of the device of the invention is interposed between two rotating sealing elements which are also disposed between the rolling bearings.

Thus the invention permits not only the obtainment of a diameter of the rotating transformer which is as small as possible, since the transformer is disposed in the region of the smallest radius of the interface between the fixed part and the rotating part of the wheel and maximum stability and precision of the air gap due to the immediate vicinity of the rolling bearings disposed on each side thereof, but also a complete protection against mechanical attack and a large protection against risks of soiling.

The device according to the invention also permits maintaining the rotating transformer either in an environment of air or gas or in an environment of oil.

Advantageously, the device may be so designed that the rotating transmitter transits to the fixed part the data relating to the pressure, means such as for example a computer, being provided preferably on the fixed part, for piloting the deflation and/or the inflation of the tire. In other words, the electronic circuit associated with the pressure sensor and which comprises on the wheel means for shaping the signals of the sensor, comprises a part carried preferably by the fixed part or chassis of the vehicle for piloting the deflation and/or inflation by using the pressure signals from the sensor.

In this way it is possible to obtain several different deflation and/or inflation values with high precision.

Preferably, pressure signals are transferred from the secondary winding to the primary winding during intervals of time separating the successive pulses of the chopped or interrupted current.

Further features and advantages of the invention will appear from the following description given by way of a non-limiting example with reference to the accompanying drawings, in which.

Figure 1:
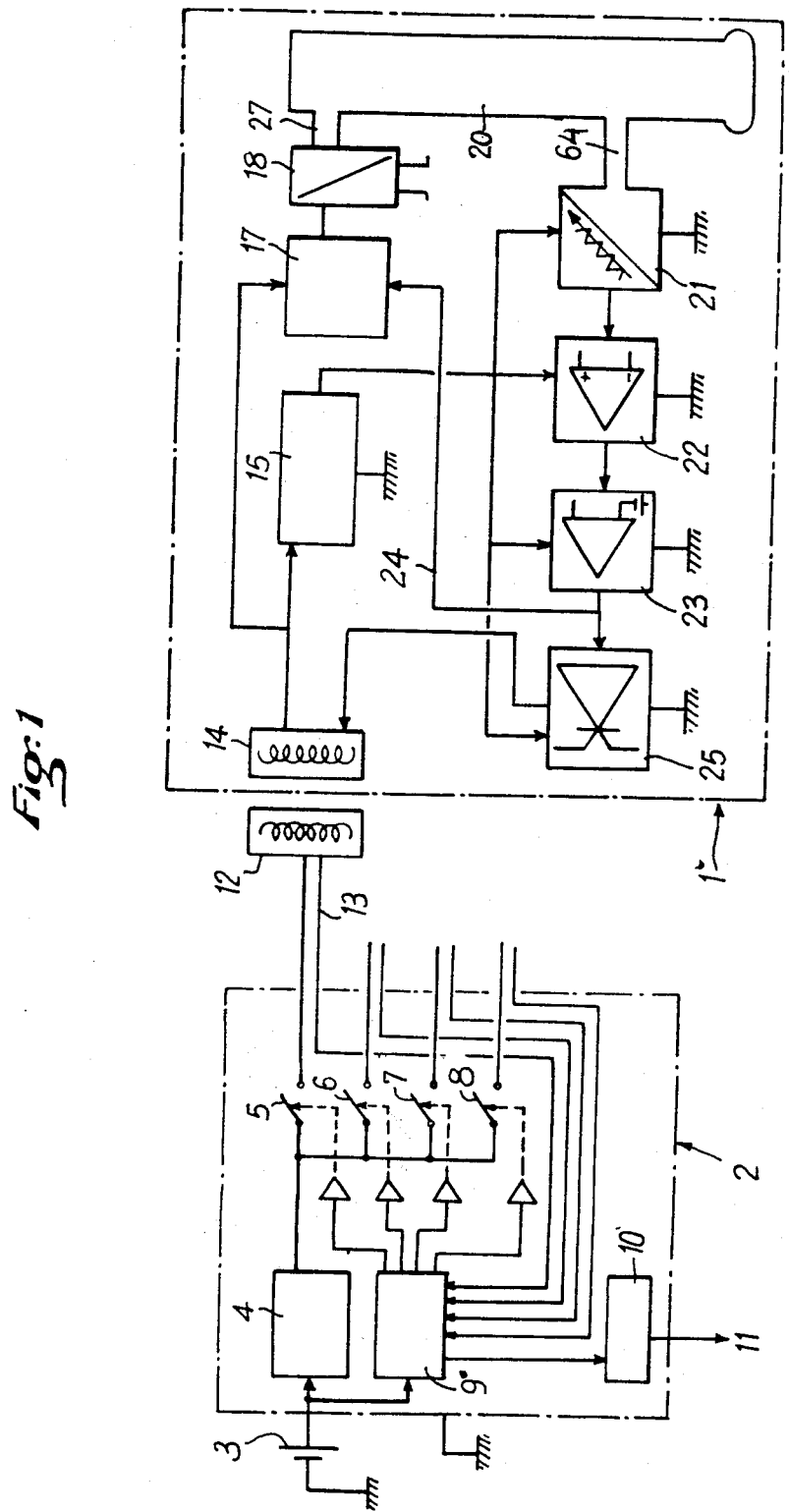
FIG. 1 is a diagrammatic view of a device according to the invention.

Reference will first be made to FIG. 1.

The device according to the invention has a moving part carried by a wheel and generally designated by the reference numeral 1, and a fixed part common to each wheel part 1. The fixed part comprises a control device generally designated by the reference numeral 2 and supplied with dc current by a source 3, for example the 12 V battery of the vehicle. This source supplies power to a supply device 4 which includes a dc/dc converter. This current is interrupted or broken at the suitable frequency and sent by the device to a group of switches 5,6,7,8 each of which serves one of the wheel. This supply device is piloted by a logic control and supervising device 9, hereinafter termed a computer, which is connected through a conventional interface 10 to a bus 11 leading to a control panel actuated by the driver of the vehicle. The computer 9 is, in accordance with the instructions given by the driver, capable of actuating one, several or all of the switches 5,6,7,8 so as to deflate the pneumatic tires of the corresponding wheels.

Each of the aforementioned switches controls the supply of current to a primary winding 12 of a rotating transmitter pertaining to the corresponding wheel. A circuit 13 returns to the computer data, preferably in the form of a frequency modulated signal coming from the moving part 1. Such means have been shown for example in the French patent application No. 80 27,676 filed by the applicants on Dec. 29, 1980, and reference can be made to this application for details of construction. This frequency modulated signal enables the computer to know at each instant the pressure prevailing inside the tire.

This detection circuit 13 may however be omitted in a simplified version of the device according to the invention.

The fixed primary winding 12 of the rotating transmitter is placed in confronting relation to the secondary winding 14 rotatively mounted on the wheel assembly 1 so as to provide an electromagnetic coupling delivering to the wheel pulses at the suitable frequency, the device being easily capable in this way of transmitting to the part 1 a power of several tens of watts.

The secondary winding 14 supplies power to a stabilized power circuit 15 which delivers a stabilized dc voltage. Simultaneously, the secondary winding 14 supplies power to the coil or control device 16 (see FIG. 3) of the electrovalve 17 which is part of the servovalve 18 and is in communication with the interior of the tire 20 through a passage 19 normally closed by a valve closure member (see FIG. 2).

The pneumatic tire 20 also communicates through a passage 64 with a pressure sensor 21 capable of delivering a dc voltage which varies as a function of the value of the pressure. The sensor 21 transmits this data to an amplifier 22 whose output is connected to one of the inputs of a minimum pressure detector constructed in the conventional manner in the form of a comparator 23. So long as the pressure detected by the sensor 21 is higher than the minimum value input to the comparator 23, which is equal to the value of the desired residual pressure in the tire 20 at the end of the deflation, the comparator delivers no signal at its output during the deflating stage. When the pressure in the tire 20 reaches this lower value, the comparator delivers a signal which is sent through a line 24 to the control element 16 of the electrovalve 17 so as to close it even if the current tending to cause its opening still reaches it from the secondary winding 14. The signal delivered by the comparator 23 is also sent to a deflation indicating circuit 25 which, when it is actuated, sends to the secondary winding 14 a signal having a given frequency, for example between 50 kHz and 100 kHz.

This signal is transmitted through the electromagnetic coupling through the primary winding 12 and then through the circuit 13 and suitable filters, to the computer 9 of the control and supervising part 2. Further, the passage outside the band width of the frequency between 50 and 100 kHz, as an upper or lower value permits the detection, by means of the computer, of possible anomalies of the moving part.

These various elements 21,22,23 and 25 are supplied with power by the stabilized supply device 15.

The operation is then as follows:

Assuming that the various pneumatic tires are inflated at their normal value adapted to travelling over a hard surface or a road, the driver desires to deflate one or more wheel tires to the chosen lower limit value. He then gives instructions to the computer 9 which causes the actuation of the relay or relays corresponding to the chosen wheel or wheels and supplies the wheel primary winding 12. The power signal is received by the secondary winding 14 which sends it to the stabilized supply device 15 and to the control device 16 of the electrovalve 17, and instantaneously causes the opening of the latter, which causes the opening of the closure member 26 of the servovalve 18 and consequently the connection between the interior of the tire and the open tire through the passage 27 of large section, so that the tire is deflated. The opening is maintained until the pressure detected by the sensor 21 has reached the lower limit value previously set in the eomparator 23, which causes the closure of the electrovalve 17, and therefore of the servovalve 18, and the sending of the corresponding closure data through the circuit 25 to the fixed control unit 2. The driver of the vehicle is thus informed that the limit value has been reached and that the servovalve is closed.

Figure 2:
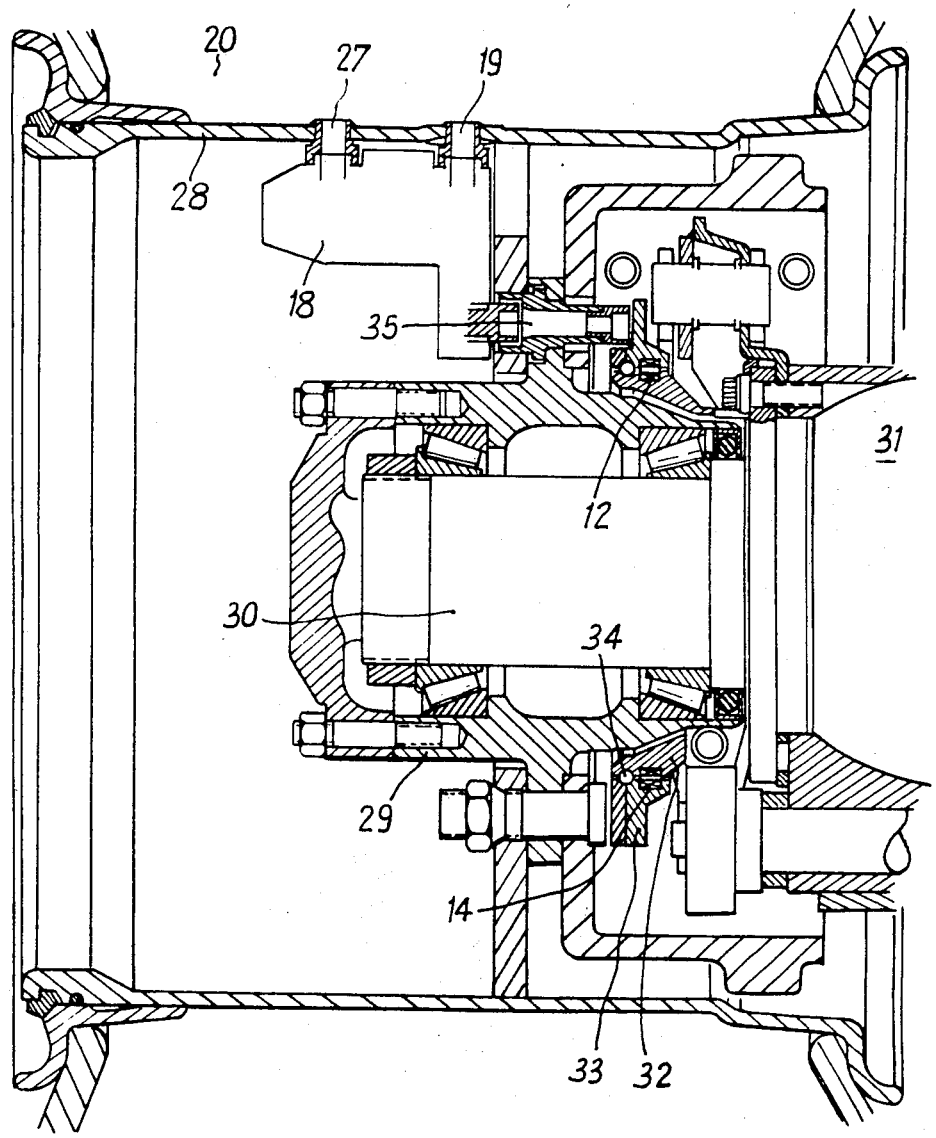
FIG. 2 is a sectional view of the assembly of the device in the region of a wheel.

With reference to FIG. 2, there is shown an embodiment in which a wheel, comprising a rim 28 and a penumatic tire 20, is mounted by its hub 29 on the wheel axle 30 carried by the steering ball joint unit 31. A fixed ring 32 carries the priamry winding 12 of a rotating transformer. A second rotatable ring 33, mounted on the hub 29, carries the secondary winding 14, it being exactly positioned relative to the ring 32 by means of an intermediate rolling bearing 34. The conductors leading from the secondary winding 14 extend, through a hollow nut 35, to the servovalve 18 which comprises, in a housing of suitable shape, the electrovalve 17 with its control element 16 and the various other elements of the rotatable part, namely the elements 21,22,23,24 and 25.

Figure 3:
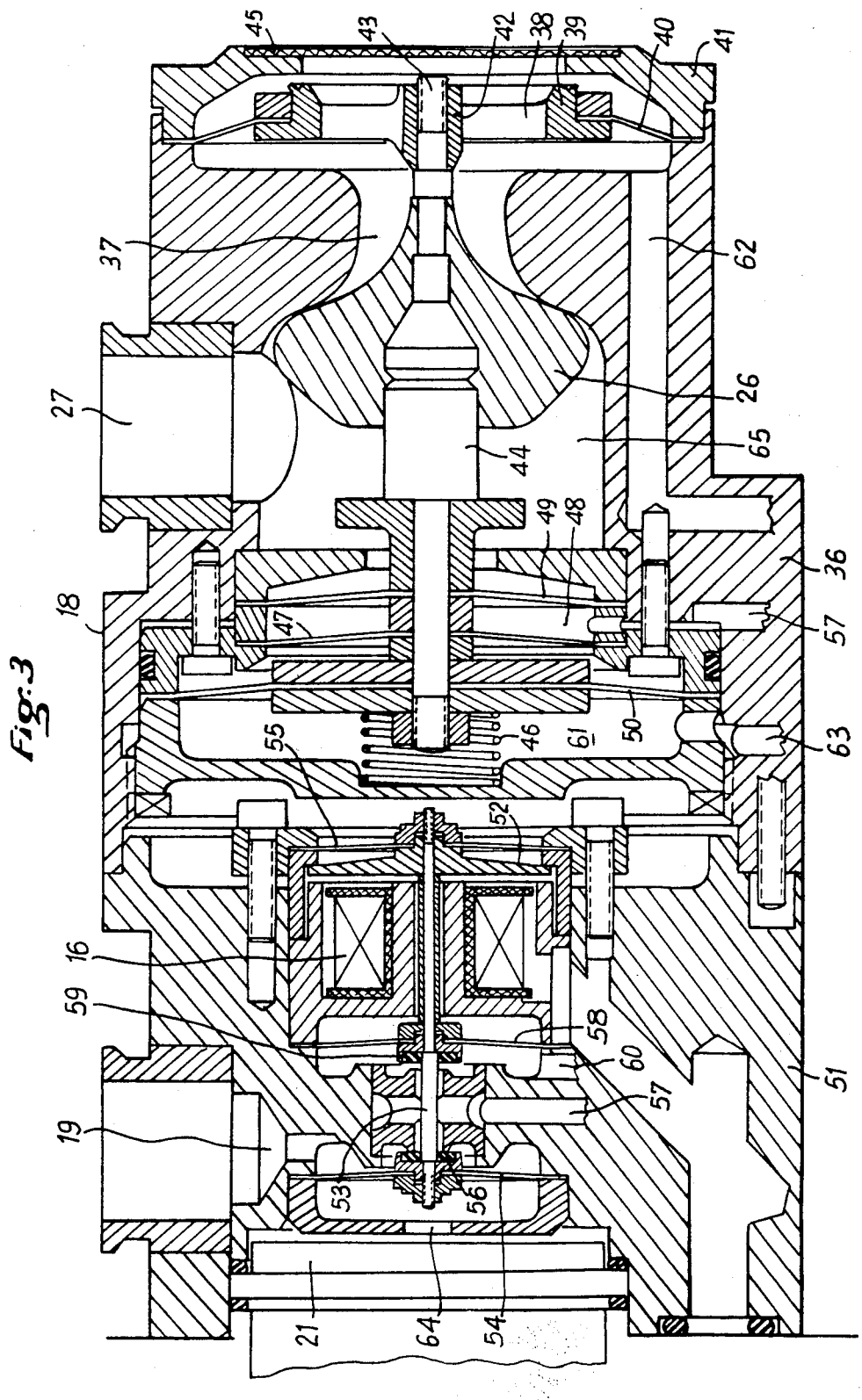
FIG. 3 is a sectional view of a servovalve of this device.

With reference to FIG. 3, it can be seen that the servovalve 18 comprises a housing 36 provided with a passage 37 of large diameter which has, adjacent to the interior of the tire, a curved shape 37 which also has a large diameter and is normally closed by the closure member 26 whose curved shape completes, when the closure member is in its open position, the passage 27 with a closure member profile permitting the rapid discharge of the air from the tire to the atmosphere, through openings 38 of a device 39 maintained in position by a diaphragm which is in the form of a ring 40 immobilized against the housing 36 by a ring 41, radial spokes maintaining a central bearing surface portion 42 receiving and guiding the end portion 43 of the rod 44 of the valve closure member 26. A protective large-mesh grill 45 permits the rapid passage of air under pressure to the atmosphere while protecting the device from exterior impurities. The rod 44 is normally biased to its valve closing position, shown in the drawing, by a spring 46. An apertured. metal diaphragm 47, mounted on the rod 44 and connected to the housing on its periphery, insures the good alignment of the rod 44. A chamber 48 is therefore defined at its rear end by a diaphragm 49 and at its front end by a second diaphragm 50. When air under pressure coming from the inside of the tire is sent, through a suitable passage, to the chamber 48, the diaphragm 50 is shifted in opposition to the action of the spring 46 and causes the displacement of the rod 44 and consequently the opening of the valve member 26.

The control part 17 of the servovalve, located in a housing 51, is also connected to the interior of the tire through the passage 19. This part comprises a coil 16 capable of acting on a magnetic cheek 52 in such manner as to exert a thrust on a rod 53 carried and guided by two apertured metal diaphragms 54 and 55. The rod carries, in the vicinity of the diaphragm 54, a valve closure member 56 which normally closes the passage between the conduit 19 and a conduit 57 communicating with the chamber 48. The rod carries, in the region of an intermediate sealing diaphragm 58, another valve closure member 59 which closes a passage 60 which permits, in the normal inoperative position shown in FIG. 3, putting the conduit 57, and consequently the chamber 48, in communication with the open air through a suitable discharge conduit 62.

Parallely, this conduit 60 communicates with the chamber 61 of the spring 46 through the conduit 63 so as to put the pressure of the chamber 48 in communication with the chamber 61 and cancel out the action of the fluid of the pneumatic tire in the chamber 48 on the diaphragm 47 in the event of an obstruction of the purge orifice 62 by mud, ice, snow, etc. . . .

Moreover, it can be seen that the pressure sensor 21 is put in communication with the interior of the tire through a passage 64 which communicates with the passage 19, so that it is remote from the deflation flow and can consequently deliver an instantaneous exact measurement of the pressure in this tire in the course of deflation, and consequently cause the immediate stoppage of the deflation when the lower value has been reached.

The electrovalve constructed in this way, with a passage 27 having a diameter of 15 mm, achieves, by the control means of the invention, and with perfect reliability, the deflation of a tire 19 which has a volume of 500 liters and is initially inflated to a value of 3 bars, down to a deflation limit value of 1 bar within about 15 seconds.

The invention can of course be subjected to many modifications, in particular, there may be added to this device an inflating device leading to the chamber 65 formed by the passage 27, through rotating sealing elements, such as described for exampe in French patent application No. 84 11,781 filed by the applicants on July 25, 1984 and employing for the control the same pressure detecting means, and in particular, the sensor 21 and, for the transmission, the same coupling means 12,14.

Figure 4:
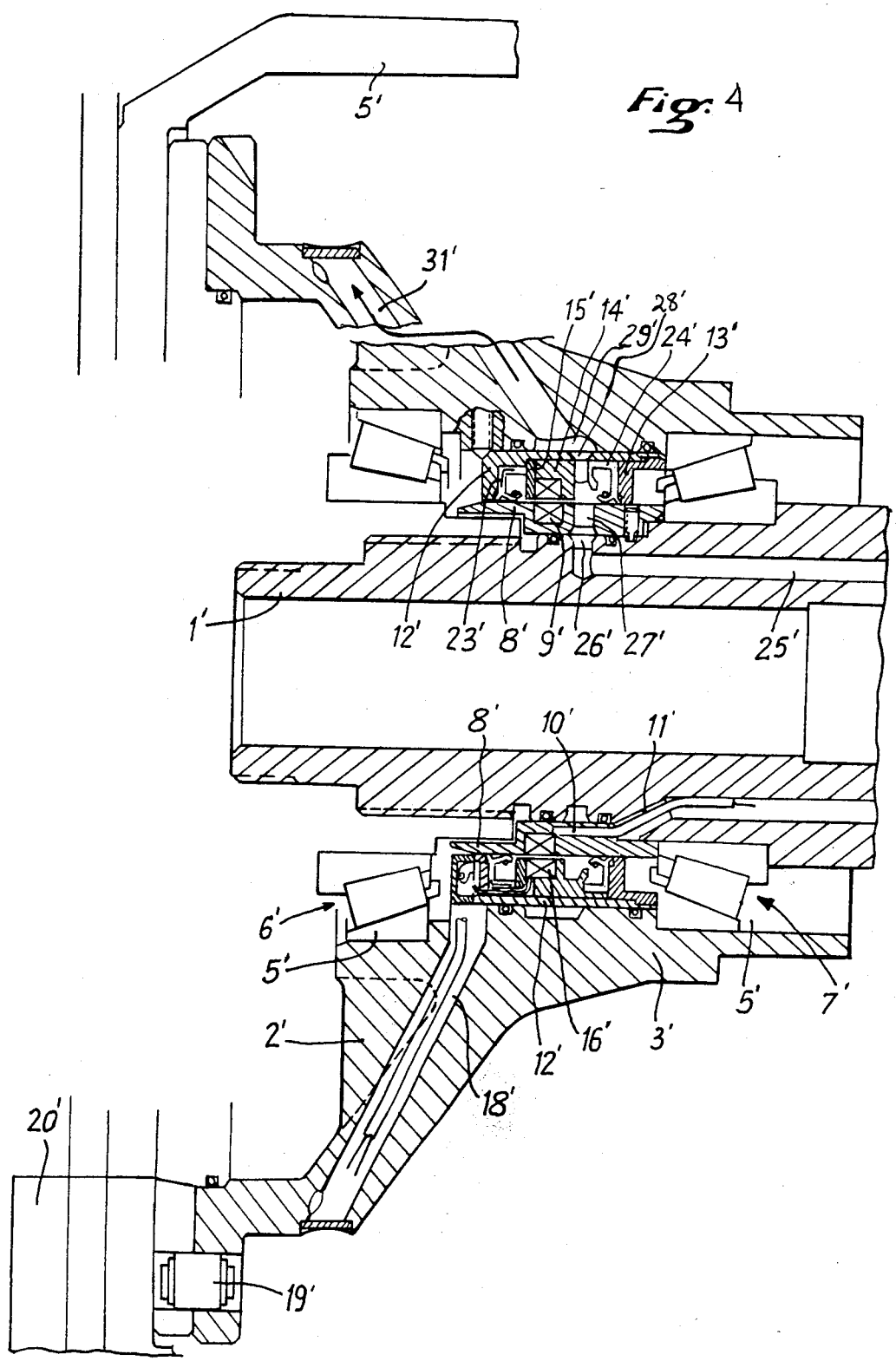
FIG. 4 is an axial sectional view of a device according to an improvement of the invention in the region of the wheel with a servovalve mounted on the rotatable part of the wheel.

Reference will now be made to FIG. 4.

The fixed part of a vehicle has a stub-axle 1' mounted on a chassis and a wheel 2' comprising a hub 3' with a disk and a rim 5' on which a pneumatic tire (not shown) is mounted. Interposed between the hub and the stub-axle are two conventional roller bearings 6',7' whose races are respectively fixed on the stub-axle and on the hub in the conventional manner. The hub has in the conventional manner a median part of smaller inside diameter which forms, on each side, an axial shoulder for the hub races 5' of the roller bearings 6' and 7'.

The stub-axle 1' is surrounded, in confronting relation to said median part, by an element 8' in the form of a sleeve having a peripheral groove in which the primary winding 9' of a rotating transformer is disposed. As can be seen in the upper part of FIG. 4, the element 8' has orifices 10' which provide a passage communicating with an orifice 11' formed in the stub-axle, the conduit thus provided permitting the passage of the electrical conductors leading to the primary winding 9'.

Disposed in front of the element 8' is an L-sectioned element 12' fixed against an element 13' held in position by one of the two roller bearing races mounted on the hub 3'. Fixed between the elements 12' and 13' are two ferromagnetic elements 14',15' which constitute, when they are united, an inner groove occupied by the secondary winding 16' of the rotating transformer; An orifice in the element 12' provides a passage communicating with orifices 18' in the hub so as to constitute a conduit for the passage of electric conductors which are connected, through a coaxial connector diagrammatically shown at 19', to the wheel electronic circuit disposed in an annular cavity 20'. The cavity 20' contains a servovalve with a controlling electrovalve. The electronic means associated with a pressure sensor are contained in the cavity 20'.

Clamped between the elements 12' and 15' and 13' and 14' respectively are the bodies of two sealing elements 23',24' whose lips cooperate with the smooth surface of the element 8'. As can be seen, these conventional elements have a portion in contact with the surface of the element 8', a radial portion extending, in respect of the sealing element 23', in contact with the radial flange of the element 12' and, in respect of the sealing element 24', along the radial flange of the element 13'. A peripheral shoe of the sealing elements bears against the corresponding horizontal parts of the element 12'. It can also be seen that the radial flanges of the elements 12' and 13' extend to the vicinity of the cylindrical surface of the element 8' from which they are spaced by a small gap whose width is preferably on the order of 3/10ths of a millimeter. The purpose of these elements is to guide the hub when it is mounted on the stub-axle so as to avoid damage to the sealing elements.

The centrifugal faces of the elements 15' and 14' which define the air gap with the ferromagnetic element 8' are spaced from the latter a distance on the order of 5/10ths of a millimetre, which constitutes the air gap.

The circular springs placed on the sealing elements 23',24' bias the latter against the cylindrical surface of the element 8' sufficiently to insure oil- tightness so that the oil or grease from the roller bearings is unable to reach the space defined between the sealing elements 23',24'. The fluid or air under pressure for the pneumatic tire, coming from a source or a compressor carried by the chassis of the vehicle, passes through a conduit 25' provided in the stub-axle 1', and in the form of a radial passage 26' in the element 8' and communicating with an inner groove 27' in the latter. From there, the air passes through passages 28' in the element 13' which lead to a peripheral groove 29' communicating with a passage 30' in the element 12' and then with passages 31' in the hub and the wheel, and reaches the servovalve for inflating the tire.

Oil passages (not shown) permit the circulation of oil for lubricating the roller bearings.

Owing to the perfect protection thus provided, the rotating transformer 9',16' may be constructed in a very elaborate manner.

When no fluid pressure is sent to the conduit 25', the lips of the sealing elements 23',24' are subjected to force only by their springs and limit their action to providing an oil seal. Consequently, there is practically no wear of the lips by the action of the rotation with respect to the element 8'. On the other hand, if pressure is established in the fluid conduit for inflating the tire, the lips are biased by the effect of the pressure and cooperate with the peripheral surface of the element 8' and achieve air-tightness. The rotating transformer benefits from the protection, on one hand, the sealing elements 23',24' and, on the other hand, the roller bearings 6',7' and there is no risk of being subjected to mechanical attack. The sealing elements contribute to an additional protection against risk of soiling, in particular in the region of the air gap. Moreover, it will be understood that the primary and secondary windings of the rotating transformer, which are in contact with large metal elements and in an oil environment, are suitably cooled, which permits the passage of a large amount of energy if desired.

Figure 5:
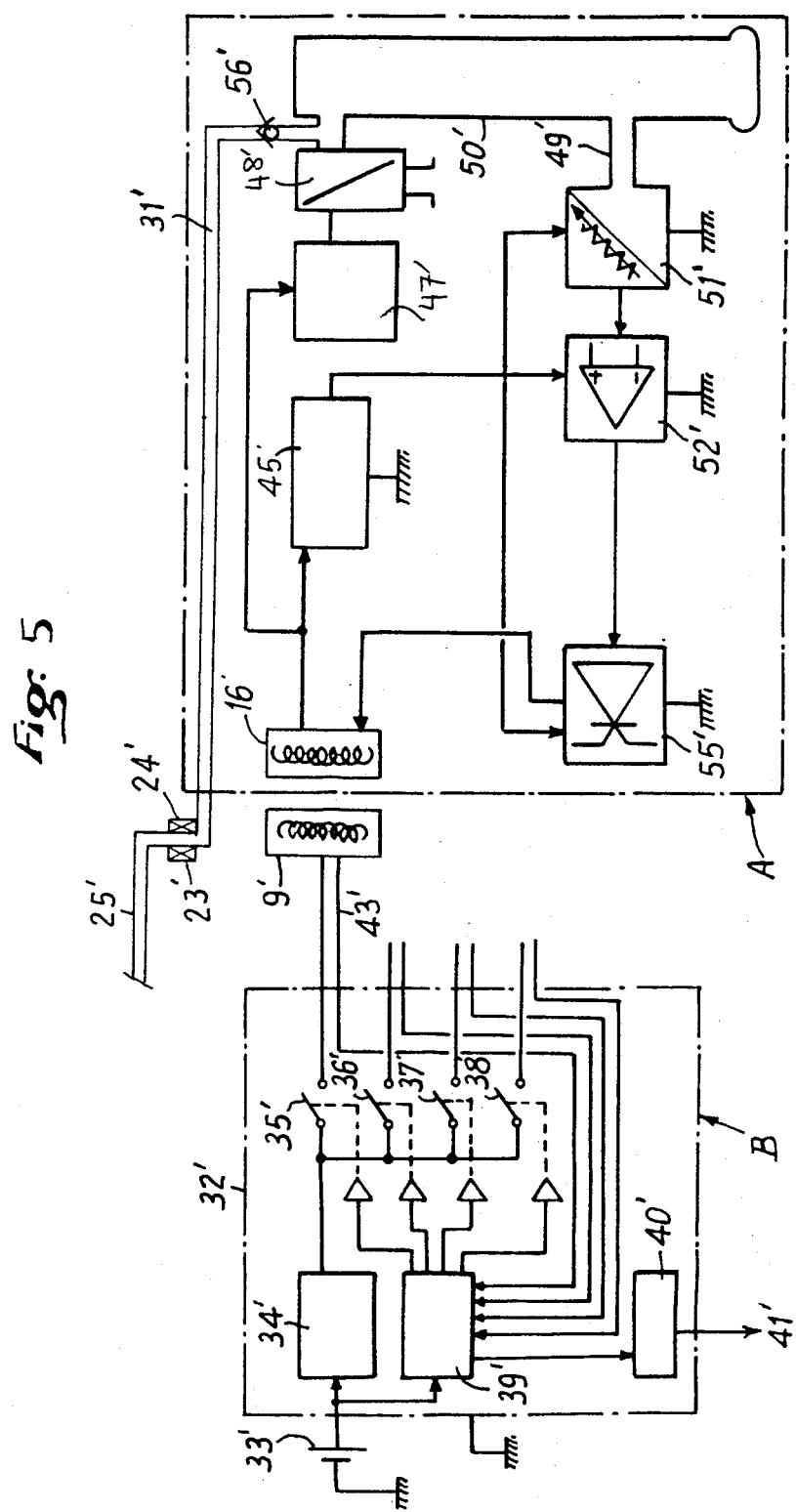
FIG. 5 is a diagrammatic view of the device shown in FIG. 4.

Reference will now be made more particularly to Fig. 5.

The device comprises a movable part A carried by the wheel and a fixed part B common to each wheel part. The fixed part comprises a control device generally designated by the reference numeral 32' and supplied with power by a dc source 33', for example the 12 V or 24 V battery of the vehicle. This source supplies power to a supply device 34' which includes a dc/dc converter. This current is interrupted at the suitable frequency and is transmitted by the device to a group of switches 35',36',37' and 38' each of which pertains to one of the wheels. This supply device is piloted by a logic supervising and control device 39', hereinafter designated a computer, which is connected through a conventional interface 40' to a bus 41' leading to a control panel actuated by the pilot or driver of the vehicle. According to the instructions received from the driver, the computer 39' is capable of actuating one, several or all of the switches 35',36',37' and 38', depending on the instructions to be sent, for the deflation of the tires of the wheels.

Each of said switches controls the supply of power to a primary winding 9' of the rotating transformer allocated to the corresponding wheel. A circuit 43' permits returning to the computer data, preferably in the form of a frequency modulated signal, from the moving part A. Such means have been shown for example in French patent application No. 80 27,676 filed by the applicants on Dec. 29, 1980 and reference may be made to this application for the details of construction. This frequency modulated signal enables the computer to know at any instant the pressure prevailing in the tire.

This detecting circuit 43' may however be omitted in a simplified version of the device according to the invention.

The fixed primary winding 9' of the rotating transmitter is disposed in facing relation to the rotating secondary winding 16' mounted on the wheel assembly A so as to provide an electromagnetic coupling delivering to the assembly A pulses at the suitable frequency, the device being thus easily capable of transmitting to the part A a power of several tens of watts.

The secondary winding 16' supplies power to a stabilized power circuit 45' which delivers a stabilized dc voltage. Simultaneously, the secondary winding 16' supplies power to the coil or the device controlling the electrovalve 47' which is part of the servovalve 48' and communicates, through a passage which is normally closed by a valve closure member, with the interior of the tire 50'.

The tire 50' also communicates through a passage 49' with a pressure sensor 51' capable of delivering a dc voltage which varies as a function of the value of the pressure. The sensor 51' transmits this data to an amplifier 52' whose output is connected to a pressure indicating circuit 55' which, when actuated, transmits to the secondary winding 16' a signal having a given frequency between, for example, 50 kHz and 100 kHz.

This signal is transmitted, through the electromagnetic coupling, to the primary winding 9' and then, through the circuit 43' and suitable filters, to the computer 39' of the supervising and control part B. Further, the passage of frequencies which are higher or lower than the band of frequencies between 50 and 100 kHz, permits the detection by means of the computer of possible anomalies of the moving part.

These various elements 51',52' and 55' are supplied with power by the stabilized power device 45'.

The operation is then as follows:

Assuming that the various tires are inflated to their normal value adapted to travelling on a hard surface or on the road, the pilot or driver desires to deflate one or more tires of the wheels to the chosen lower limit value. He then inputs instructions to the computer 39' which causes the actuation of the relay or relays corresponding to the chosen wheel or wheels and supplies power to the primary winding 9' of the respective wheel. The power signal is received by the secondary winding 16' which transmits it to the stabilized power device 45' and to the control device 47' of the electrovalve 48' which immediately opens the latter and causes the opening of the closure member of the servovalve 48' and consequently puts the tire in communication with the free air through a discharge passage of large section. The opening is maintained until the pressure detected by the sensor 51' has reached a lower limit value previously input to the computer 39', which causes the closure of the electrovalve 47' and consequently of the servovalve 48'. The pilot or driver is also informed that the limit value has been reached and that the servovalve is closed.

For inflating, the passage 25' is connected by a suitable conventional directional valve (not shown) to a source of pressure, such as for example a compressor mounted on the vehicle. The pressure which is thus established in the passage 31' is transmitted to the interior of the tire 50' through a simple check-valve 56' which may be advantageously mounted also in the body of the servovalve 48' so as to communicate with the interior of the tire 50'. During this inflating operation, the valve of the pressure is transmitted as before, by means of the directional valve (not shown) the transmission of the pressure through the passage 25' and consequently stops the inflation at the desired value input to the computer 39'.

What is claimed is:

1. A device for deflating tires of wheels of a vehicle, and in particular a rapid intervention vehicle or a military vehicle having a chassis, adapted to permit, by means of a centralized control, an extremely rapid deflation of the tires of the wheels of the vehicle, said device comprising, on each wheel having a tire to be deflated, a servovalve having a large-section passage directly connected to the tire and capable of instantaneously putting the tire in communication with the open air, an electrovalve associated with the servovalve for causing the closure of the servovalve, a pressure sensor responsive to the pressure of the tire, and an electrical circuit associated with the sensor and connected to the electrovalve, said device further comprising, in the region of each of said wheels, an electromagnetic coupling element constituted by a rotating transmitter having a primary winding which is fixed relative to the chassis of the vehicle and a secondary winding which is mounted on the wheel and is rotatable without contact with the primary winding and in facing relation to the primary winding and connected to the electrovalve for causing the opening of the servovalve and connected to the electrical circuit associated with the sensor, which electrical circuit is so adapted and arranged that, when the pressure detected by the sensor reaches a predetermined low value, the electrical circuit causes the closure of the servovalve, a source of electrical current, and power supply lines connecting the source to the primary windings of the rotating transmitters associated with the various wheels.

2. A device according to claim 1, wherein the source of electric current sends to the primary winding of each rotating transmitter a chopped or otherwise interrupted direct current.

3. A device according to claim 1, wherein the servovalve includes a valve closure member and the electrovalve is adapted to employ the pressure existing in the tire it serves for providing assistance to the opening of the valve closure member.

4. A device according to claim 2, wherein the servovalve includes a valve closure member and the electrovalve is adapted to employ the pressure existing in the tire it serves for providing assistance to the opening of the valve closure member.

5. A device according to claim 3, wherein the electrovalve comprises an auxiliary passage connected to the respective tire, an auxiliary valve closure member inserted in the auxiliary passage for opening and closing the auxiliary passage, an electomagnetic element of the electrovalve associated with the auxiliary valve closure member for opening the auxiliary valve closure member, and a driving element of large area associated with the main valve closure member for opening the main valve closure member, the opening of said auxiliary valve closure member supplying the pressure to the driving element.

6. A device according to claim 4, wherein the electrovalve comprises an auxiliary passage connected to the respective tire, an auxiliary valve closure member inserted in the auxiliary passage for opening and closing the auxiliary passage, an electromagnetic element of the electrovalve associated with the auxiliary valve closure member for opening the auxiliary valve closure member, and a driving element of large area associated with the main valve closure member for opening the main valve closure member, the opening of said auxiliary valve closure member supplying the pressure to the driving element.

7. A device according to 3, wherein the electrovalve comprises moving parts and diaphragms are associated with said moving parts for actuating and/or guiding them.

8. A device according to claim 1, comprising a control element for the electrovalve, and stabilized supply means connected to supply current to the circuit associated with the pressure sensor, the secondary winding of the rotating transmitter being connected to supply power to the control element of the electrovalve and to the stabilized supply means.

9. A device according to claim 1, wherein the circuit associated with the sensor comprises, at an output of the sensor which converts the detected pressure into a dc voltage, an amplifier and, after the amplifier, a comparator to which the desired predetermined low value of the pressure is input.

10. A device according to claim 2, wherein the circuit associated with the sensor comprises, at an output of the sensor which converts the detected pressure into a dc voltage, an amplifier and, after the amplifier, a comparator to which the desired predetermined low value of the pressure is input.

11. A device according to claim 9, comprising a circuit for transmittting, through the secondary winding and primary winding, data showing that the predetermined low pressure value has been reached.

12. A device according to claim 10, comprising a circuit for transmitting, through the secondary winding and primary winding, data showing that the predetermined low pressure value has been reached.

13. A device according to claim 1, comprising a computer fixed relative to the chassis, switches connected to be controlled by the computer and inserted in said power supply lines of the primary windings.

14. A device according to claim 7, comprising a diaphragm associated with the valve closure member for the large-section passage for controlling said valve closure member and defining, on one side of the diaphragm, a first chamber connected to the electrovalve so as to be subjected to the pressure of the tire and thereby actuate said valve closure member and, on an opposite side of the diaphragm, a second chamber which normally does not receive the pressure, a conduit connecting the first chamber to a purge orifice, the second chamber communicating with said conduit in such manner that, in the event of obstruction of the purge orifice, a counterpressure can be established in the second chamber which cancels out the effect of the pressure of the first chamber on said diaphragm.

15. A device according to claim 1, wherein the pressure sensor is connected to the interior of the tire through a passage located at a distance from the deflating stream.

16. A device according to claim 1, comprising means for inflating the tires of the wheels of the vehicle during the travelling of the vehicle including a source of compressed air or gas, rotating sealing elements interposed between each wheel and fixed means supporting the wheel connected to the chassis, distribution electrovalves, a computer connected to pilot the distribution electrovalves so as to transmit the pressure to the various tires through said rotating sealing elements, said rotating sealing elements being adapted to be put under pressure by said pressure only during the inflating operation and communicating each time with a chamber formed by said large-section passage of the servovalve.

17. A device according to claim 1, comprising two rolling bearings for each wheel, the primary winding and the secondary winding of the rotating transmitter being disposed between said two rolling bearings.

18. A device according to claim 2, comprising two rolling bearings for each wheel, the primary winding and the secondary winding of the rotating transmitter being disposed between said two rolling bearings.

19. A device according to claim 1, comprising means fixed relative to the chassis of the vehicle, associated with the sensor of each tire, responsive to pressure signals delivered by the sensor and adapted to cause the deflation and/or inflation of the respective tire.

20. A device according to claim 17, wherein each wheel has a stub-axle and a coaxial rim, and rolling bearings are interposed between the stub-axle and the rim.

21. A device according to claim 18, wherein said wheel has a stub-axle and a coaxial rim, and rolling bearings are interposed between the stub-axle and the rim.

22. A device according to claim 17, comprising two rotating sealing elements which are interposed between the two rollings bearings, the rotating transmitter being interposed between the rotating sealing elements and adapted to permit inflation and/or deflation of the respective tire.

23. A device according to claim 18, comprising two rotating sealing elements which are interposed between the two rolling bearings, the rotating transmitter being interposed between the rotating sealing elements and adapted to permit inflation and/or deflation of the respective tire.

24. A device according to claim 17, wherein the rotating sealing elements are adapted to make sealing contact only when pressure is established.

25. A device according to claim 18, wherein the rotating sealing elements are adapted to make sealing contact only when pressure is established.

26. A device according to claim 22, wherein each wheel comprises a stub-axle, a hub and a coaxial rim rotatively mounted on the stub-axle, a sleeve-shaped element defining a groove is fastened on the stub-axle between the two rolling bearings, and two L-sectioned members are mounted on the hub and disposed close together so as to form a groove, the primary winding of the rotating transmitter being carried in the groove of the sleeve-shaped element and the secondary winding of the rotating transmitter being mounted on the groove of said two L-sectioned members.

27. A device according to claim 23, wherein each wheel comprises a stub-axle, a hub and a coaxial rim rotatively mounted on the stub-axle, a sleeve-shaped element defining a groove is fastened on the stub-axle between the two rolling bearings, and two L-sectioned members are mounted on the hub and disposed close together so as to form a groove, the primary winding of the rotating transmitter being carried in the groove of the sleeve-shaped element and the secondary winding of the rotating transmitter being mounted in the groove of said two L-sectioned members.

28. A device according to claim 2, so adapted and arranged that pressure signals from the pressure sensor of the respective wheel travel between the secondary winding and the primary winding of the rotating transmitter during an interval of time between two consecutive pulses of a chopped or otherwise interrupted current sent to the electrovalve from a part of the vehicle which is fixed relative to the chassis through the rotating transmitter.

* * * * *